United States Patent
Mangin

(10) Patent No.: US 7,073,337 B2
(45) Date of Patent: Jul. 11, 2006

(54) COMBINED POWER GENERATION AND DESALINIZATION APPARATUS AND RELATED METHOD

(75) Inventor: Etienne Marie Luc Mangin, Belfort (FR)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 10/448,201

(22) Filed: May 30, 2003

(65) Prior Publication Data

US 2004/0237539 A1 Dec. 2, 2004

(51) Int. Cl.
*F02C 6/04* (2006.01)

(52) U.S. Cl. .......................................... 60/783; 60/784
(58) Field of Classification Search ................... 60/783, 60/784, 39.182
See application file for complete search history.

(56) References Cited

U.S. PATENT DOCUMENTS

| | | | | |
|---|---|---|---|---|
| 4,094,747 A | * | 6/1978 | Pfenninger | 202/173 |
| 5,405,503 A | | 4/1995 | Simpson et al. | |
| 5,632,143 A | * | 5/1997 | Fisher et al. | 60/39.182 |
| 5,887,418 A | * | 3/1999 | Bruckner et al. | 60/783 |
| 5,925,223 A | | 7/1999 | Simpson et al. | |
| 6,125,623 A | * | 10/2000 | Cloyd et al. | 60/783 |
| 6,539,718 B1 | | 4/2003 | Bronicki et al. | |
| 2001/0029732 A1 | * | 10/2001 | Bachmann | 60/39.02 |
| 2004/0128976 A1 | * | 7/2004 | Gralla | 60/39.182 |

OTHER PUBLICATIONS

"MHTGR For Supplying Fresh Water" Internet: http://www.nuc.berkeley.edu/designs/mhtgr/sea.html.
"The ABCs of Desalting" by O.K. Buros, published by the International Desalination Association.

* cited by examiner

*Primary Examiner*—Charles G. Freay
(74) *Attorney, Agent, or Firm*—Nixon & Vanderhye P.C.

(57) ABSTRACT

A method of generating electrical power while simultaneously converting salt water to fresh water includes the steps of: a) supplying exhaust gases from a gas turbine used to generate electrical power to a boiler located downstream of the gas turbine and upstream of a gas turbine exhaust gas stack; b) employing a closed thermal transfer fluid circuit between the boiler and a desalinization plant for recirculating the thermal transfer fluid between a first heat exchange in the boiler and a second heat exchanger in the desalinization plant where the thermal transfer fluid passes in heat exchange relationship with the seawater to thereby heat the seawater as a first step in a distillation process.

7 Claims, 1 Drawing Sheet

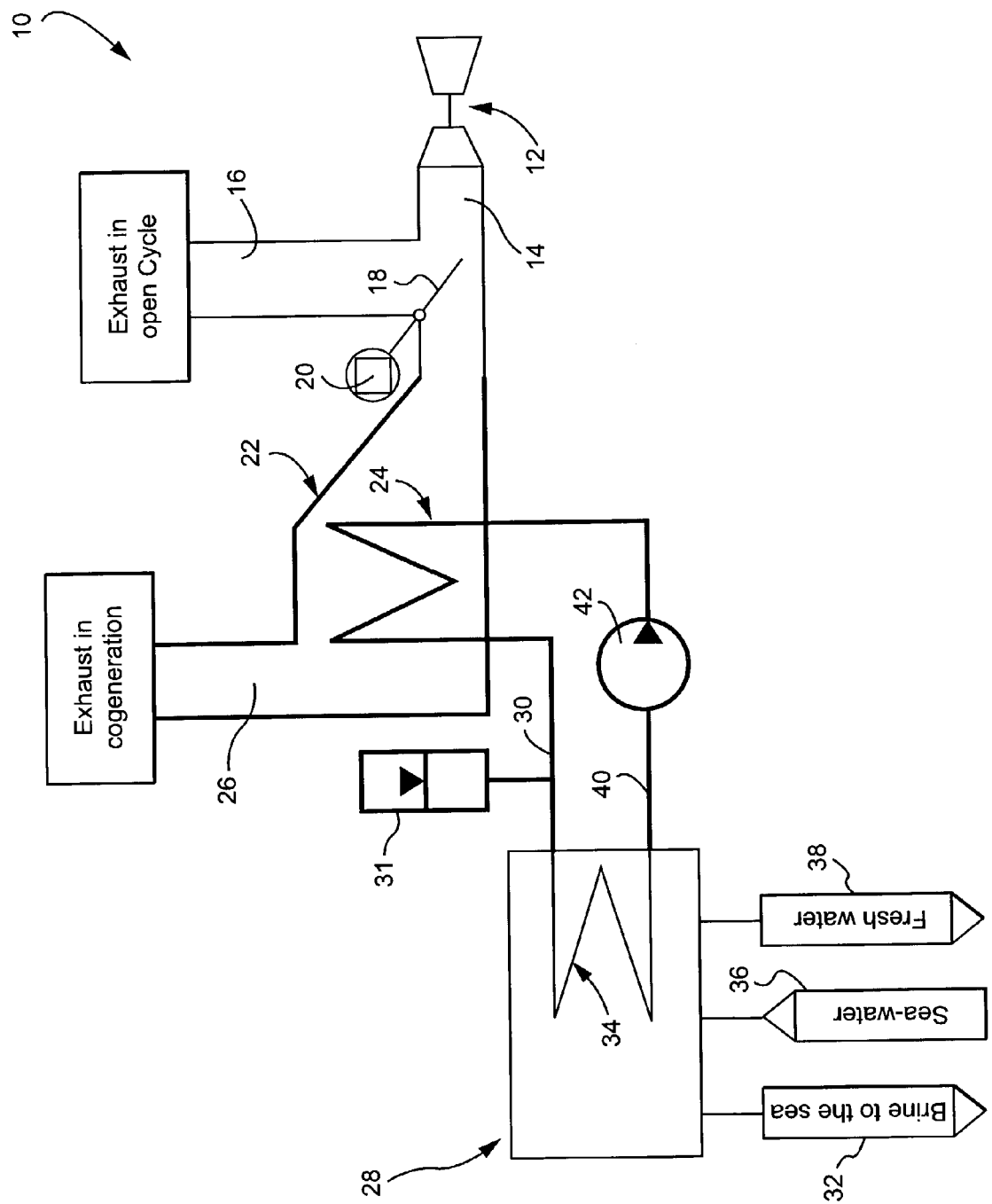

COMBINED POWER GENERATION AND DESALINIZATION APPARATUS AND RELATED METHOD

BACKGROUND OF THE INVENTION

This invention relates generally to power generation and simultaneous desalinization of seawater. Specifically, the invention relates to improving thermal efficiency by using the heat of exhaust gases of a gas turbine to heat water used in the distillation of seawater.

Commercially available desalinization techniques can be classified generally into two categories. The first includes distillation processes that require mainly heat plus some electricity for ancillary equipment. The second includes reverse osmosis processes. In the distillation processes, vapor is produced by heating the seawater close to its boiling temperature and passing it through a series of stages under successively decreasing pressures to induce flashing. The vapor produced is then condensed and cooled as distillate.

In reverse osmosis processes, pure water is forced to pass under pressure through special semi-permeable membranes, while salt is rejected. The pressure differential must be high enough to overcome the natural tendency of water to move from the low salt concentration side of a membrane to the high concentration side, as determined by osmotic pressure.

This invention is particularly adapted for distillation processes that typically use low pressure steam to heat the seawater as a first step in the distillation process.

When desalinization plants are integrated into gas turbine power plants, they are invariably incorporated as combined cycle power plants that utilize both gas and steam turbines. In combined cycle plants, electricity is produced with high-pressure steam, generated by heat exchange with gas turbine exhaust gases, to run turbines that in turn power electric generators. In a typical case, boilers produce high-pressure steam at about 540° C. (1,000° F.). As this steam expands in the turbine, its temperature and energy level is reduced. Distillation plants need steam having a temperature of about 120° C. (248° F.) or below, and this steam can be obtained by extracting lower temperature steam at the low pressure end of the turbine after much of its energy has been used to generate electricity. This low pressure steam is then run through the distillation plant's brine heater, thereby increasing the temperature of the incoming seawater. The condensate from the extracted steam is then returned to the boiler to be reheated.

BRIEF DESCRIPTION OF THE INVENTION

This invention uses the calories of the gas turbine exhaust gases without having to resort to a complex and expensive installation as in the case of a combined cycle power generation plant. More specifically, a thermal transfer fluid (such as demineralized water) is heated by the gas turbine exhaust gases and used in place of low pressure steam to heat the seawater in the initial step of the distillation process.

In the exemplary embodiment, a boiler is placed in the gas turbine exhaust gas flowpath. A damper upstream of an open cycle exhaust stack permits diversion of the gas turbine exhaust gases into the boiler in a cogeneration mode. The heat of the exhaust gases is transferred via a heat exchanger in the boiler to the thermal transfer liquid (demineralized water) and this liquid is supplied to the desalinization plant where it is passed in heat exchange relationship with the seawater to heat the latter in an otherwise conventional distillation process. After heat exchange, the exhaust gases are released to atmosphere.

The advantages of using hot water as the thermal transfer fluid for the desalinization by distillation include:
a) Simplicity of the boiler and its installation;
b) Low cost compared to an installation that uses steam to heat the seawater;
c) Low pressure of the circulating pump; and
d) No consumption of the thermal transfer fluid.

One disadvantage of using hot water as the thermal transfer fluid for desalinization by distillation is the significant flow of water required in the circuit (for the same transfer of calories), in comparison with the amount of low pressure steam required. However, this disadvantage is outweighed by the advantages noted above.

In its broader aspects, therefore, the invention relates to a method of generating electrical power while simultaneously converting salt water to fresh water comprising: a) supplying exhaust gases from a gas turbine used to generate electrical power to a boiler located downstream of the gas turbine and upstream of a gas turbine exhaust gas stack; b) employing a closed thermal transfer fluid circuit between the boiler and a desalinization plant for recirculating the thermal transfer fluid between a first heat exchange in the boiler and a second heat exchanger in the desalinization plant where the thermal transfer fluid passes in heat exchange relationship with the seawater to thereby heat the seawater as a first step in a distillation process.

In another aspect, the invention relates to a combined gas turbine power generating plant and seawater desalinization plant comprising a gas turbine for generating electrical power and producing exhaust gases to be released to atmosphere; a desalinization plant for removing salt from water; and a closed thermal fluid circuit arranged between an exhaust gas duct of the gas turbine and the desalinization plant, the circuit including a first heat exchanger arranged to heat a thermal transfer fluid with heat from the gas turbine exhaust gases and to supply heated thermal transfer fluid to the desalinization plant for heat exchange with the seawater.

The invention will now be described in connection with the drawing identified below.

BRIEF DESCRIPTION OF THE DRAWINGS

The FIGURE is a schematic flow diagram of a combined gas turbine power generation/desalinization plant in accordance with the exemplary embodiment of the invention.

DETAILED DESCRIPTION OF THE INVENTION

With reference to the sole FIGURE, the plant 10 includes a gas turbine 12 of conventional construction, used to produce electrical power. The gas turbine is provided with an exhaust duct 14 leading to a first exhaust stack 16 used when the turbine is operated in an open cycle mode. A damper 18, operated by control 20, is arranged to open or close the inlet to the stack 16. When stack 16 is closed by the damper, the gas turbine will operate in a cogeneration mode, and the exhaust gases will flow into a boiler 22 provided with a heat exchanger 24. The exhaust gases will flow across the heat exchanger and be released to atmosphere via a second exhaust stack 26. Heat from the exhaust gases is transferred to a thermal transfer fluid flowing in the heat exchanger 24, and the heated thermal transfer fluid is then supplied to a desalinization plant 28 via stream 30. One satisfactory thermal transfer fluid is demineralized water, but other suitable liquids may be employed. An accumulator 31 is employed in the stream 30 upstream of the desalinization plant 28 to compensate for the dilatation of the thermal transfer fluid. The plant 28 is an otherwise conventional unit that desalts seawater by a commercially available distillation process. Stream 30 feeds the thermal transfer fluid to heat exchanger 34 in the plant 28. Seawater flows into the desalinization plant 28 via inlet 36 and flows across the heat exchanger 34 to thereby increase the temperature of the seawater to the level required for distillation. After the distillation process is complete, brine is returned to the sea and removed via outlet 32, and fresh water produced by the distillation process is taken from the plant 28 via outlet stream 38.

The thermal transfer fluid, cooled via heat exchange with the seawater, is returned to the boiler 22 via stream 40 and a circulation pump 42. Thus, a closed circuit thermal transfer fluid circuit is formed that includes insulated piping (for streams 30, 40), heat exchangers 24 and 34, the accumulator 31 and pump 42.

The simple and effective installation makes efficient use of the gas turbine exhaust gases for heating seawater in a distillation process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of generating electrical power while simultaneously converting seawater to fresh water comprising:
    a) diverting exhaust gases from a first exhaust gas stack of the gas turbine to a boiler provided with a single heat exchanger, said boiler located downstream of the gas turbine and said first exhaust gas stack;
    b) employing a closed thermal transfer fluid circuit between said boiler and a desalinization plant for recirculating a thermal transfer fluid between said single heat exchanger in said boiler and a second heat exchanger in said desalinization plant where said thermal transfer fluid passes in heat exchange relationship with the seawater to thereby heat the seawater as a first step in a distillation process, including providing an accumulator in said circuit, upstream of said desalinization plant; and
    c) releasing the exhaust gases to atmosphere through a second exhaust stack of the boiler.

2. The method of claim 1 wherein recirculating of said thermal transfer fluid is accomplished by providing a pump in said circuit.

3. The method of claim 1 wherein said thermal transfer fluid comprises demineralized water.

4. The method of claim 1 wherein, during step b), thermal heat transfer fluid, cooled in said second heat exchanger, is returned to said boiler for re-heating by the gas turbine exhaust gases.

5. A combined gas turbine power generating plant and seawater desalinization plant comprising:
    a gas turbine for generating electrical power and producing exhaust gases to be released to atmosphere;
    a desalinization plant for removing salt from said seawater;
    a closed thermal fluid circuit arranged between an exhaust gas duct of said gas turbine and said desalinization plant, said circuit including a boiler having a single heat exchanger, said single heat exchanger arranged to heat a thermal transfer fluid with heat from the gas turbine exhaust gases and to supply heated thermal transfer fluid to said desalinization plant for heat exchange with the seawater, said circuit further including an accumulator located in said closed circuit upstream of said desalinization plant; wherein a first exhaust gas stack is located upstream of the boiler and a second exhaust stack is located downstream of the boiler, and further wherein a damper is arranged to control flow of the exhaust gases between said first exhaust gas stack and said boiler.

6. The combined gas turbine power generating plant and seawater desalinization plant of claim 5 and further comprising a pump in said closed circuit on an outlet side of said desalinization plant for returning thermal transfer fluid to said first heat exchanger.

7. The combined gas turbine power generating plant and seawater desalinization plant of claim 5 wherein said thermal transfer fluid comprises demineralized water.

* * * * *